(12) United States Patent
Togashi (10) Patent No.: US 7,675,654 B2
(45) Date of Patent: Mar. 9, 2010

(54) IMAGE READING APPARATUS AND IMAGE PROCESSING METHOD

(75) Inventor: Kazunori Togashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 11/451,658

(22) Filed: Jun. 13, 2006

(65) Prior Publication Data

US 2006/0285176 A1 Dec. 21, 2006

(30) Foreign Application Priority Data

Jun. 16, 2005 (JP) ............................. 2005-176892

(51) Int. Cl.
*H04N 1/04* (2006.01)
*B65H 1/22* (2006.01)
*B65H 1/00* (2006.01)

(52) U.S. Cl. ................... 358/474; 358/498; 271/4.05; 271/8.1

(58) Field of Classification Search ............... 358/474, 358/498, 468, 494, 496; 271/3.05, 3.08, 271/3.14, 3.18, 4.05, 8.1, 9.3, 10.01, 10.06, 271/10.07, 10.1, 307
See application file for complete search history.

(56) References Cited

U.S. PATENT DOCUMENTS 5,604,577 A * 2/1997 Wakuda et al. ............... 399/364
5,984,301 A * 11/1999 Holbert et al. ............... 271/227
7,472,905 B2 * 1/2009 Inoue ........................... 271/227
2005/0012263 A1 * 1/2005 Koyanagi et al. ............. 271/227
2005/0035528 A1 * 2/2005 Suga et al. ................ 271/10.12
2005/0218586 A1 * 10/2005 Agata ........................... 271/226
2005/0242493 A1 * 11/2005 Agata ........................... 271/226
2006/0017214 A1 * 1/2006 Inoue ........................ 271/10.12
2006/0170149 A1 * 8/2006 Seto ............................. 271/240
2006/0222419 A1 * 10/2006 Ishibashi et al. ............. 399/301
2007/0003345 A1 * 1/2007 Sato ............................. 399/388

FOREIGN PATENT DOCUMENTS

JP 2003-338908 A 11/2003
JP 02004244125 * 9/2004
JP 02006044880 * 2/2009

* cited by examiner

*Primary Examiner*—Jerome Grant, II
(74) *Attorney, Agent, or Firm*—Canon U.S.A., Inc. I.P. Division (57) ABSTRACT

An image reading apparatus includes a document positioning plate configured to have a document positioned thereon, a conveyance belt configured to convey the document to the document positioning plate, an image reading unit configured to read an image of the document positioned on the document positioning plate, and an image unevenness reducing unit configured to reduce image unevenness caused by the conveyance belt deflecting in a main scanning direction. The image unevenness reducing unit corrects the readout image based on correction coefficients each corresponding to a combination of a sub scanning position and a main scanning position of the image.

13 Claims, 9 Drawing Sheets

MAIN SCANNING POSITION

FIG.3C

MAIN SCANNING

SUB SCANNING

FIG.4

MAIN SCANNING

SUB SCANNING

IMAGE READING APPARATUS AND IMAGE PROCESSING METHOD

BACKGROUND OF THE INVENTION

1. Field of the Invention

The present invention relates to a technique applicable to an image reading apparatus that may generate image unevenness.

2. Description of the Related Art

There have been made available conventional image reading apparatuses equipped with an automatic document feeder (ADF) that can automatically feed documents one by one. The image reading apparatus includes an endless conveyance belt that can press a document onto a document positioning glass and also shift the document along the glass.

In general, the endless conveyance belt has inclined parts at the front and rear ends of its lower side (i.e., bottom) to smoothly guide a document to or from the document positioning glass. In other words, the conveyance belt floats against the document positioning glass at its front and rear ends. Thus, the conveyance belt cannot firmly press both a leading edge and a trailing edge of a document in a sub scanning direction, although the conveyance belt can firmly press the central region of the document.

The floating of the conveyance belt induces undesirable phenomenon, such as "image unevenness," resulting from local deterioration in the document reading level changing depending on the sub scanning position. More specifically, the image reading level becomes lower (darker) at the leading edge and the trailing edge of the image, compared to the reading level at the central region of the image. Such a local deterioration in the image reading level is the main cause that generates image unevenness.

To solve this problem, Japanese Patent Application Laid-Open No. 2003-338908 discusses a technique capable of correcting image unevenness caused in the sub scanning direction due to the floating of a conveyance belt. However, the above-described conventional technique is only effective to eliminate the image unevenness in the sub scanning direction, and accordingly cannot correct image unevenness which may be caused when the conveyance belt deflects in the main scanning direction.

In this case, conveyance rollers driving the conveyance belt as well as driven rollers driven by the conveyance belt may enhance the image unevenness caused by the conveyance belt deflecting in the main scanning direction.

SUMMARY OF THE INVENTION

The present invention is directed to an apparatus and method capable of solving the aforementioned problems. Furthermore, the present invention is directed to an image reading apparatus and an image processing method that can reduce image unevenness involved in a readout image, which is caused by a conveyance belt deflecting in the main scanning direction.

According to an aspect of the present invention, an image reading apparatus is provided which is configured to correct image unevenness. The apparatus includes a document positioning plate configured to position a document thereon; a conveyance belt configured to convey the document to the document positioning plate in a first general conveying direction; an image reading unit configured to read an image of the document positioned on the document positioning plate; and an image unevenness reducing unit configured to reduce image unevenness caused by the conveyance belt deflecting in a second direction generally orthogonal to the first conveying direction of the conveyance belt.

According to another aspect of the present invention, the image unevenness reducing unit may be configured to further reduce image unevenness caused by the conveyance belt floating against the document positioning plate at a leading edge or a trailing edge in the first conveying direction.

According to yet another aspect of the present invention, the image unevenness reducing unit may include a correction unit configured to correct the image based on correction coefficients corresponding to a combination of a first position with respect to the first conveying direction and a second position with respect to the second direction of the image.

According to still yet another aspect of the present invention, the correction unit may include a correction coefficient storage unit configured to store the correction coefficients each corresponding to a combination of the first position and the second position of the image; and a multiplication unit configured to multiply the correction coefficients with image data for each line of the image.

Moreover, according to another aspect of the present invention, the image reading apparatus may further include a control unit configured to control execution/non-execution of unevenness reduction processing performed by the image unevenness reducing unit.

Additionally, according to yet another aspect of the present invention, the image reading apparatus may further include an input unit configured to input, to the control unit, an instruction relating to execution/non-execution of unevenness reduction processing performed by the image unevenness reducing unit.

Furthermore, according to another aspect of the present invention, the image reading apparatus may further include a detection unit configured to detect a type of the document, wherein the control unit selectively determines execution/non-execution of unevenness reduction processing performed by the image unevenness reducing unit, according to the type of the document detected by the detection unit.

Also, according to yet another aspect of the present invention, the correction unit may include a first storage unit configured to store a first correction coefficient usable to correct image unevenness caused by the conveyance belt floating against the document positioning plate at a leading edge or a trailing edge in the first conveying direction; a second storage unit configured to store a second correction coefficient usable to correct image unevenness caused by the conveyance belt deflecting in the second direction; and a calculation unit configured to calculate a correction coefficient corresponding to the first position of the image based on the first correction coefficient and the second correction coefficient.

And, according to another aspect of the present invention, the image reading apparatus may further include an adjustment unit configured to adjust a correction coefficient calculated by the calculation unit according to a type of the document.

Further, according to another aspect of the present invention, an image processing method is provided for an image reading apparatus including a document positioning plate configured to position a document thereon, a conveyance belt configured to convey the document to the document positioning plate in a first general conveying direction, and an image reading unit configured to read an image of the document positioned on the document positioning plate. The method includes reducing image unevenness caused by the conveyance belt deflecting in a second direction generally orthogonal to the first conveying direction of the conveyance belt by correcting the image based on correction coefficients each corresponding to a combination of a first position with respect to the first conveying direction and a second position with respect to the second direction of the image.

Moreover, according to yet another aspect of the present invention, reducing image unevenness includes correcting the image by multiplying the correction coefficients each corresponding to a combination of the first position and the second position of the image with image data for each line of the image.

Furthermore, according to another aspect of the present invention, the image processing method may further include controlling execution/non-execution of unevenness reduction processing performed while reducing image unevenness.

Additionally, according to another aspect of the present invention, the image processing method may further include instructing execution/non-execution of unevenness reduction processing performed while reducing image unevenness.

And finally, according to another aspect of the present invention, the image processing method may further include detecting a type of the document, wherein the control step includes selectively determining execution/non-execution of unevenness reduction processing performed while reducing image unevenness according to the type of the document detected.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

The following description of numerous exemplary embodiments of the present invention is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Numerous exemplary embodiments of the present invention will be described in detail below with reference to the drawings.

First Exemplary Embodiment

Figure 1:
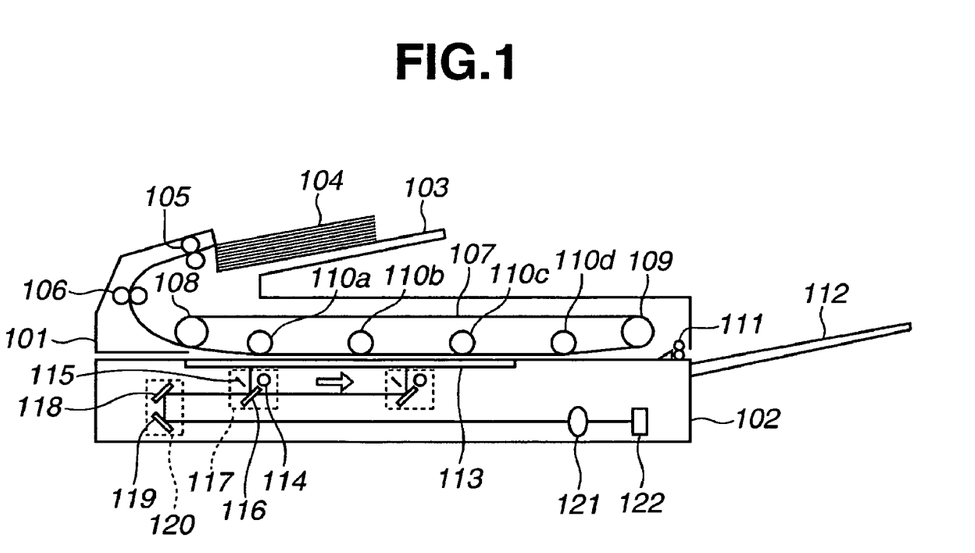
FIG. 1 is a cross-sectional view illustrating a schematic arrangement of an image reading apparatus in accordance with a first exemplary embodiment of the present invention.

FIG. 1 is a schematic cross-sectional view showing an image reading apparatus in accordance with an exemplary embodiment of the present invention. An automatic document conveyance unit 101 can feed a document to an image reading unit 102. A document tray 103 is a unit capable of positioning sheets of a document 104 thereon. A pair of pickup rollers 105 can feed the sheets of the document 104 positioned on the document tray 103 one by one from the uppermost one to a pair of conveyance rollers 106. The conveyance rollers 106 can convey each document fed from the pickup rollers 105 to the image reading unit 102.

An endless conveyance belt 107 is entrained around a driving roller 108 and a driven roller 109. The driving roller 108 can rotate the conveyance belt 107 to place a document to a predetermined position on a document positioning glass 113. The document positioning glass 113 is generally referred to as a "platen glass," although it can be made of any other material.

A predetermined number of pressing rollers 110a through 110d, each movably supported in the up-and-down direction, can depress the document, via the conveyance belt 107, onto the document positioning glass 113. Each time a reading operation is finished, the conveyance belt 107 conveys the document toward a pair of discharge rollers 111 that can discharge the document to a discharge tray 112.

The document reading apparatus 102 includes a light source 114, a reflector 115, a first mirror 116, a second mirror 118, a third mirror 119, a lens 121, and a charge-coupled device (CCD) line sensor 122. The light source 114 can generate light irradiating a document laid upside down on the document positioning glass 113. The reflector 115 can increase the efficiency in irradiating the light of the light source 114 to the document.

The first mirror 116 can receive light reflected from the document. The light source 114, the reflector 115, and the first mirror 116 can constitute a first mirror unit 117. The second mirror 118 and the third mirror 119 can constitute a second mirror unit 120.

The first mirror unit 117 and the second mirror unit 120 can move in the horizontal direction along the surface of the document positioning glass 113 as indicated by an arrow shown in FIG. 1, to read a two-dimensional image of the document. The arrow direction shown in FIG. 1 is generally referred to as a "sub scanning direction."

In a plane of the document or the document positioning glass 113, a direction perpendicular to the sub scanning direction is generally referred to as a "main scanning direction."

The document, placed on the document positioning glass 113 by the automatic document conveyance unit 101, is illuminated by the light source 114 via the reflector 115. The light reflected from the document is successively reflected by the first mirror 116, the second mirror 118, and third mirror 119. Then, the light passes through the lens 121 and reaches the CCD line sensor 122.

Figure 2A:
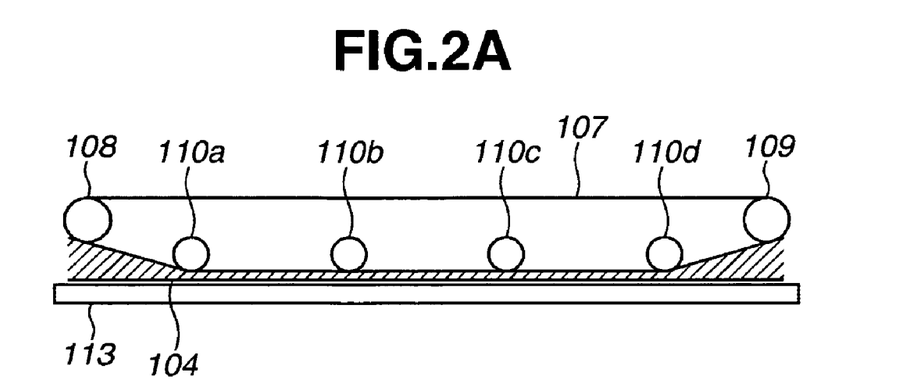
FIGS. 2A through 2C are views illustrating how first image unevenness may be caused the image reading apparatus.
Figure 2B:
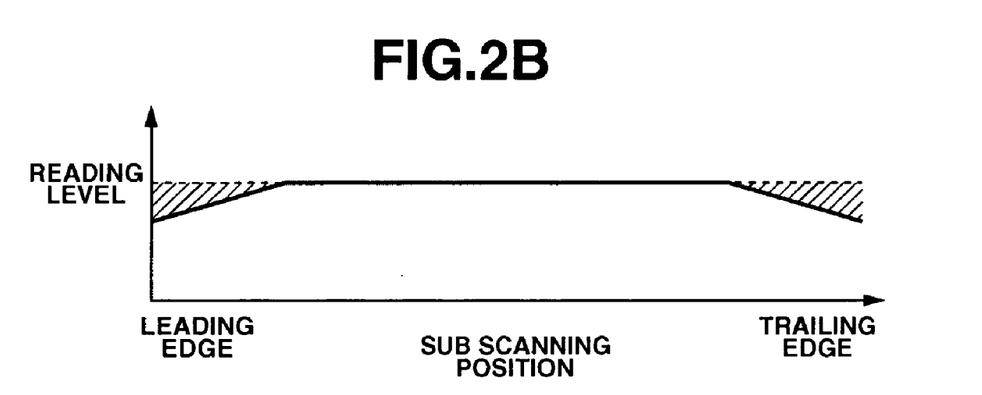
Figure 2C:
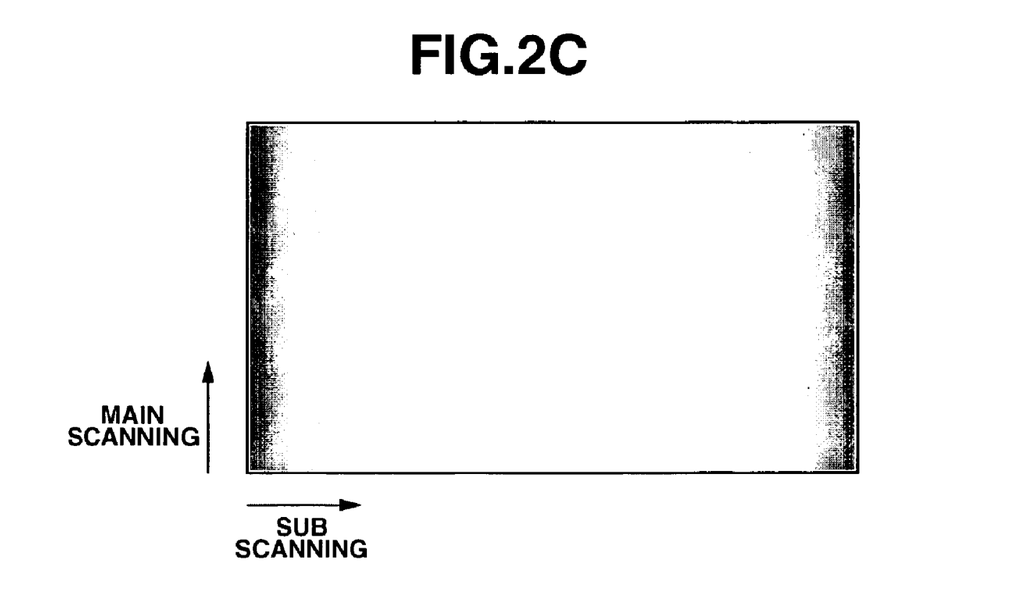

FIGS. 2A through 2C are views illustrating how first image unevenness may be caused in the image reading apparatus.

FIG. 2A is a cross-sectional view schematically showing the document 104 pressed by the conveyance belt 107 on the document positioning glass 113, taken along a line extending in the sub scanning direction. From the illustration, it is understood that the central region of the document 104 in the sub scanning direction is the region of the document which is mostly pressed by the conveyance belt 107. However, it is also evident from the illustration that the document 104 is not pressed by the conveyance belt 107 proximate both the leading edge and the trailing edge in the sub scanning direction. Therefore, as indicated by oblique lines, a significant amount of clearance is formed between the document 104 and the conveyance belt 107. In other words, the document 104 may float against the document positioning glass 113 at the leading edge and the trailing edge.

FIG. 2B shows an example of the document reading level in the sub scanning direction. According to the example shown in FIG. 2B, the reading level is relatively low at the leading edge and the trailing edge of the image compared to that at the central region of the image.

Furthermore, FIG. 2C schematically shows an example of a document image read by the image reading apparatus. According to the example shown in FIG. 2C, the document image includes image unevenness at the leading edge and the trailing edge in the sub scanning direction of the image. The image unevenness is dependent on the sub scanning position.

Figure 3A:
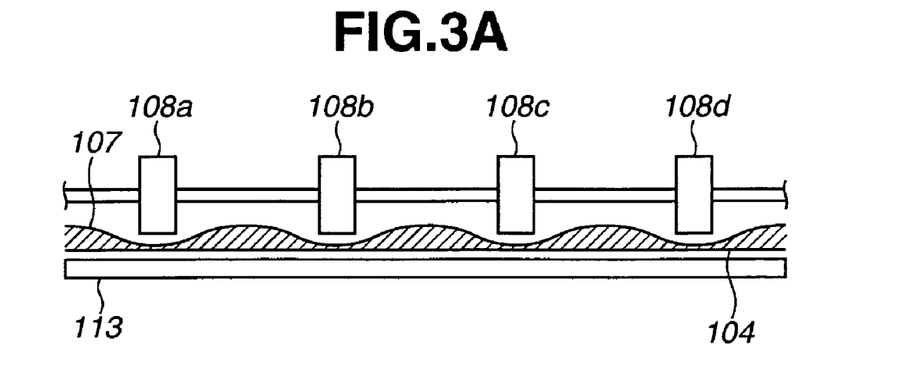
FIGS. 3A through 3C are exemplary views illustrating how second image unevenness may be caused in the image reading apparatus.
Figure 3B:
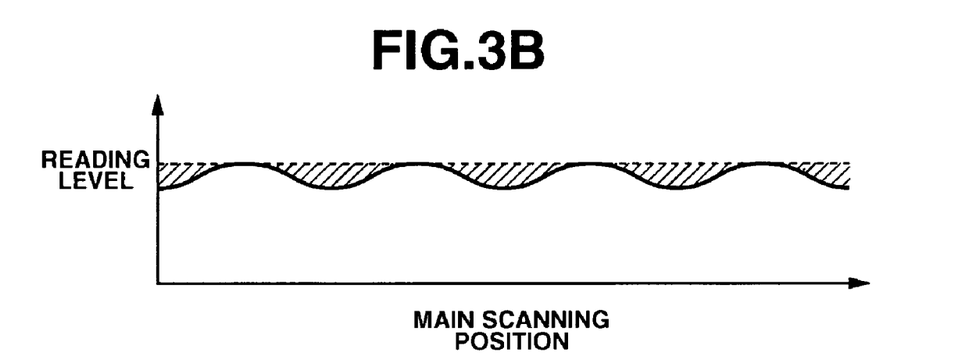
Figure 3C:
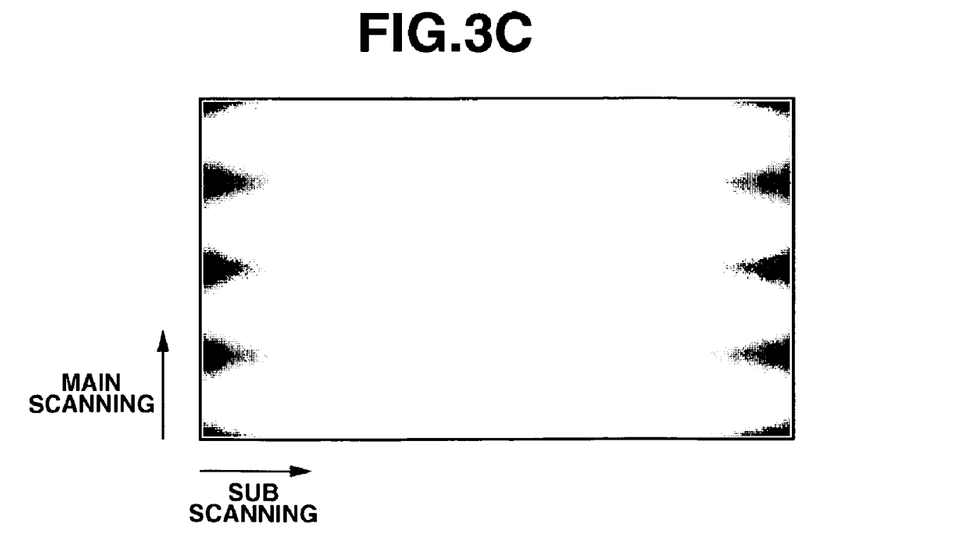

FIGS. 3A through 3C are views illustrating how second image unevenness may be caused in the image reading apparatus according to the first exemplary embodiment.

FIG. 3A is a cross-sectional view schematically showing the document 104 pressed by the conveyance belt 107 on the document positioning glass 113, taken along a line extending in the main scanning direction. According to the example shown in FIG. 3A, the driving roller 108 has plural pressing rollers 108a through 108d disposed at predetermined intervals. The driven roller 109 has a similar arrangement, although not shown in the drawings.

As shown in FIG. 3A, at the leading edge in the sub scanning direction, the conveyance belt 107 floats against the document positioning glass 113 between the pressing rollers (i.e., 108a, 108b, 108c, and 108d). Accordingly, as indicated by oblique lines, a significant amount of clearance is formed between the document 104 and the conveyance belt 107. The document reading level changes depending on the size of the generated clearance.

FIG. 3B shows an example of the document reading level in the main scanning direction. As shown in FIG. 3B, the reading level of the image at the leading edge in the sub scanning direction is relatively low and uneven compared to that at another portion (e.g., the central portion) of the image in the sub scanning direction in accordance with the deflection of the conveyance belt 107 in the main scanning direction.

Furthermore, FIG. 3C schematically shows an example of a document image read by the image reading apparatus. According to the example shown in FIG. 3C, the document image includes image unevenness generated periodically in the main scanning direction of the image. In other words, the image unevenness shown in FIG. 3C is dependent on the main scanning position.

Figure 4:
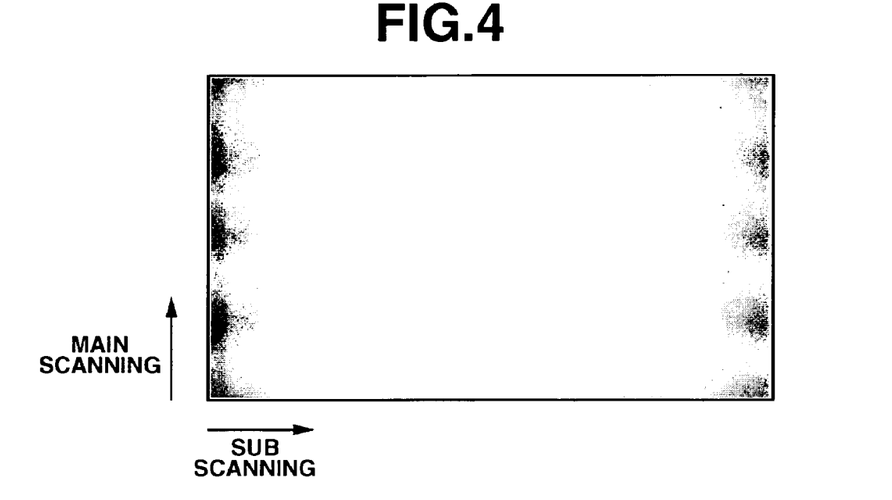
FIG. 4 is an exemplary view showing mixed image unevenness contemporaneously generated in both the sub scanning direction and the main scanning direction of a document.

FIG. 4 is a view showing mixed image unevenness contemporaneously generated in both the sub scanning direction and the main scanning direction of the document image. The image unevenness shown in FIG. 4 corresponds to a combination of the image unevenness shown in FIG. 2C and the image unevenness shown in FIG. 3C.

In general, when a document image includes the unevenness shown in FIG. 4 or in FIG. 3C, it is difficult to sufficiently reduce the image unevenness generated in the main scanning direction even when the conventional technique discussed in the above-described Japanese Patent Application Laid-Open No. 2003-338908 is used.

Figure 5:
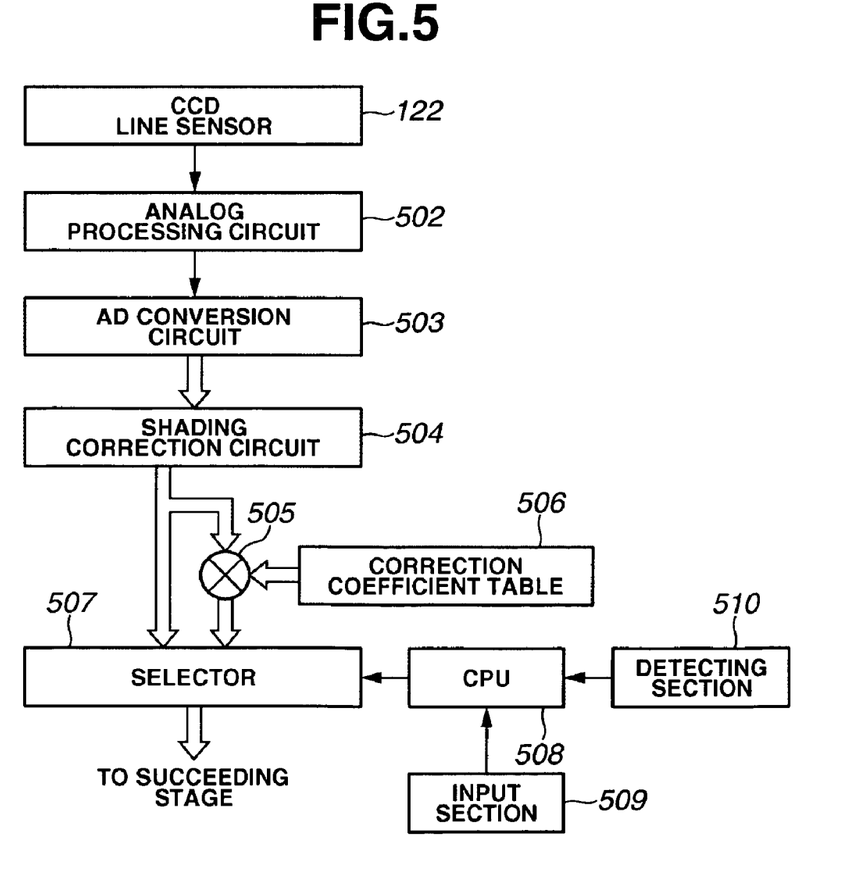
FIG. 5 is a block diagram illustrating an exemplary image reading apparatus in accordance with the first embodiment.

FIG. 5 is an exemplary block diagram illustrating an image reading apparatus according to the first exemplary embodiment. The image reading apparatus includes a CCD line sensor 122, an analog processing circuit 502, an AD conversion circuit 503, a shading correction circuit 504, a multiplication circuit 505, a correction coefficient table 506, a selector 507, a central processing unit (CPU) 508, an input section 509, and a detecting section 510.

The shading correction circuit 504 can correct shading unevenness in the main scanning direction. The correction coefficient table 506 can be stored in a storage apparatus such as a memory. The selector 507 can selectively output a signal having a corrected reading level or a signal having a non-corrected reading level to a succeeding stage (circuit). The CPU 508 can control the constituent components of the image reading unit 102.

The input section 509 is, for example, an operation panel or a communication apparatus connected to an external personal computer (PC) or the like. The detecting section 510 is a sensor capable of detecting the type (e.g., thickness) of a document. The detecting section 510 is, for example, a sensor detecting the thickness of a document or a sensor detecting the light transmissivity of a document.

When The CCD line sensor 122 receives the reflection light from the document 104, the CCD line sensor 122 outputs an image signal corresponding to a received light quantity to the analog processing circuit 502. The analog processing circuit 502 applies sampling, offset correction, and gain correction to the input image signal.

The AD conversion circuit 503 receives an analog image signal processed by the analog processing circuit 502 and converts the analog image signal into digital image data. The shading correction circuit 504 receives the digital image data, and corrects, for example, unevenness in the sensitivity among pixels constituting the CCD line sensor 122, light distribution of the light source 114, and deterioration of light quantity in the edge region of the lens 121.

The correction coefficient table 506 stores correction coefficients usable to correct the image unevenness shown in FIG. 4, if such unevenness is caused by the conveyance belt 107. More specifically, the correction coefficient table 506 stores a predetermined number of correction coefficients, each corresponding to the combination of a sub scanning position and a main scanning position. In other words, the correction coefficient table 506 stores correction coefficients for respective pixels.

The multiplication circuit 505 multiplies a digital image signal output from the shading correction circuit 504 with a correction coefficient output from the correction coefficient table 506. The correction coefficient table 506 can output correction coefficients updated in increments of, for example, one line. Thus, the correction of the document reading level can be performed in increments of one line of the image.

Thus, the image unevenness caused by the conveyance belt 107 deflecting in both the sub scanning direction and the main scanning direction can be reduced.

As described above, the correction coefficient table 506 and the multiplication circuit 505 can function as an example of an image unevenness reducing unit that can reduce image unevenness. Furthermore, the correction coefficient table 506 and the multiplication circuit 505 can function as an example of a correction unit that can correct an image based on correction coefficients each corresponding to the combination of a sub scanning position and a main scanning position of the image.

The selector 507 is a circuit capable of selectively outputting, to a succeeding stage, the image data to which the image unevenness reduction processing (i.e., reading level correction) is applied or the image data to which no image unevenness reduction processing is applied, according to an instruction given from the CPU 508.

The selector 507 outputs the non-corrected digital image data depending on the type of a document (e.g., thickness), because no correction of the document reading level is required for a particular type of document.

The CPU 508 can execute or cancel the image unevenness reduction processing based on the information relating to the type of a document (e.g., thickness) entered via the input section 509, such as an operation panel or a communication circuit.

Alternatively, the CPU 508 can control the execution of the image unevenness reduction processing based on the information obtainable from the detecting section 510, which may include a sensor detecting the thickness of a document or a sensor detecting the light transmissivity of a document.

Figure 6:
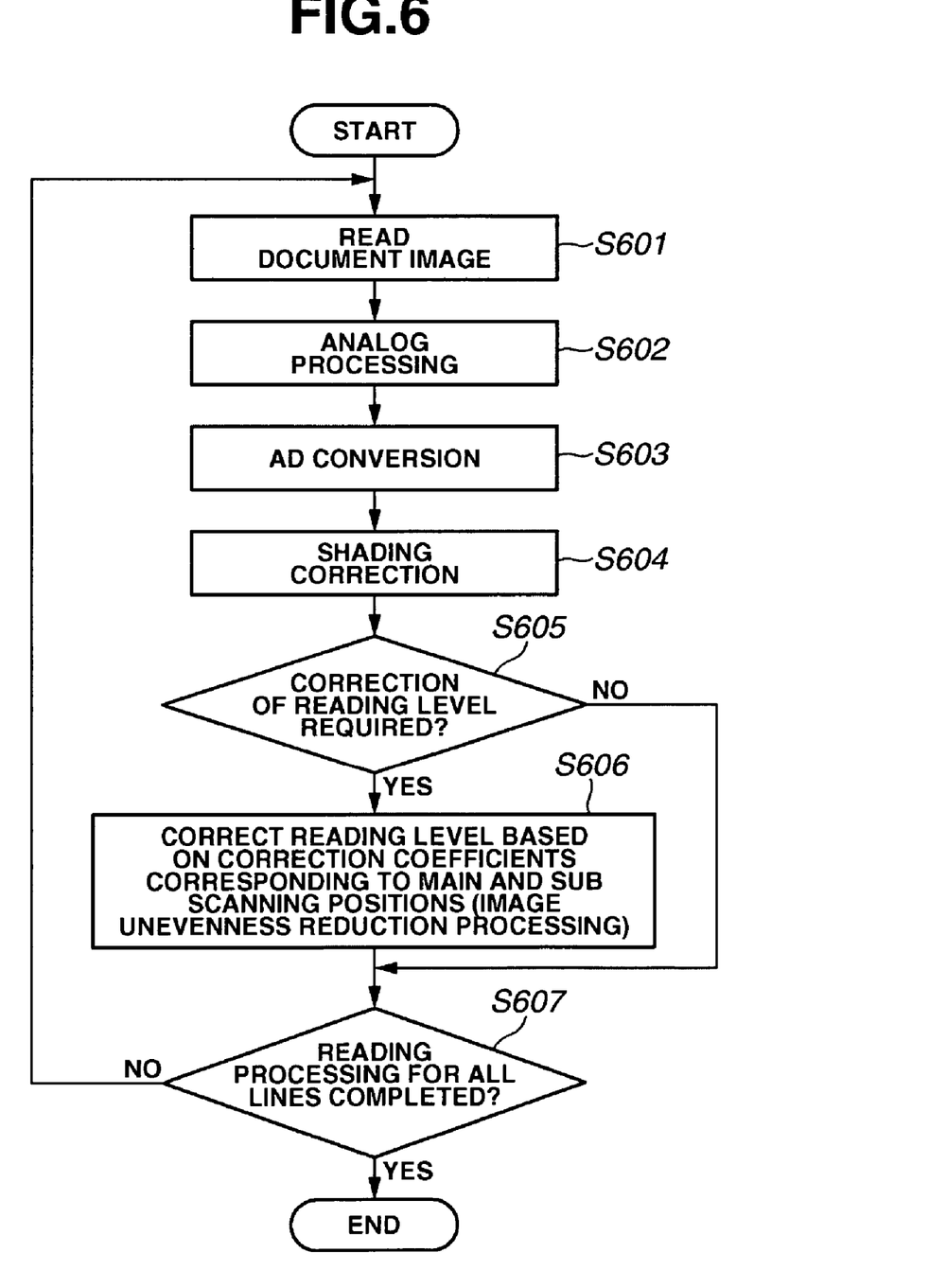
FIG. 6 is a flowchart showing an exemplary image processing method for reducing image unevenness in accordance with the first exemplary embodiment.

FIG. 6 is a flowchart showing an exemplary image processing method for reducing image unevenness in accordance with the first exemplary embodiment. In step S601, the CCD line sensor 122 reads a document image in increments of one line. In step S602, the analog processing circuit 502 applies appropriate signal processing to an analog image signal representing each readout line of the document image.

In step S603, the AD conversion circuit 503 converts the processed image signal into digital image data. In step S604, the shading correction circuit 504 applies shading correction to the image data. In step S605, the CPU 508 determines whether image unevenness reduction processing (i.e., reading level correction) is required, based on the information entered via the input section 509 or the detecting section 510.

When the image unevenness reduction processing is required (i.e., YES in step S605), the processing flow proceeds to step S606. In step S606, the CPU 508 controls the selector 507 to output image data which has been multiplied with a correction coefficient corresponding to the combination of a main scanning position and a sub scanning position.

When the image unevenness reduction processing is not required (i.e., NO in step S605), the CPU 508 controls the selector 507 to output image data having image unevenness which is not corrected. Then, in step S607, the CPU 508 determines whether the reading processing for all lines has been accomplished. When the reading processing for all lines is not yet completed (i.e., NO in step S607), the processing flow returns to step S601. When the reading processing for all lines has been completed (i.e., YES in step S607), the CPU 508 terminates the image reading processing in the flowchart of FIG. 6.

As described above, according to the present exemplary embodiment, image data (i.e., the reading level) can be corrected based on correction coefficients so as to reduce at least the image unevenness caused by the conveyance belt 107 deflecting in the main scanning direction. Thus, the image unevenness caused by the deflection of the conveyance belt 107 in the main scanning direction can be reduced.

It is needless to say that correction coefficients can be determined more precisely so that the image reading apparatus can eliminate not only the image unevenness caused by the conveyance belt 107 deflecting in the main scanning direction but also the image unevenness caused by the conveyance belt 107 floating against the document positioning plate 113 at both the leading edge or the trailing edge of a document in the sub scanning direction.

It will be possible for the CPU 508 to calculate correction coefficients during the correction processing, if the CPU 508 has a sufficient capability. Alternatively, it is desirable to experimentally obtain correction coefficients corresponding to various combinations of the sub scanning position and the main scanning position of the image. The experimentally obtained correction coefficients can be stored in a memory or comparable storage apparatus. In this case, the CPU 508 does not need to calculate the correction coefficients during the correction processing.

Furthermore, unnecessarily executing the correction may produce image unevenness. Hence, it is desirable that a control unit (e.g., CPU 508) executes the correction only when the correction (i.e., reduction processing) is necessary, so as to suppress undesirable generation of image unevenness. To this end, the CPU 508 can selectively decide execution/non-execution of the image unevenness reduction processing.

For example, the CPU 508 can determine execution/non-execution of the reading level correction processing based on an operator's instruction entered via the input section 509, such as an operation panel or a communication apparatus, or based on the information relating to the type of a document. Thus, the CPU 508 can execute the processing for correcting the document reading level with reference to an operator's preference or the type of a document.

Also, the CPU 508 can recognize the type of a document based on the information obtainable from the detecting section 510, which may include a sensor detecting the thickness of a document or a sensor detecting the light transmissivity of a document.

Second Exemplary Embodiment

According to the first exemplary embodiment, the correction coefficient table 506 stores all of the necessary correction coefficients. Thus, a relatively large storage capacity is required to store the correction coefficient table 506. If some correction coefficients can be calculated from the other correction coefficients, the required storage capacity can be decreased. The second exemplary embodiment provides an image reading apparatus that can reduce the storage capacity required for storing necessary correction coefficients.

Figure 7:
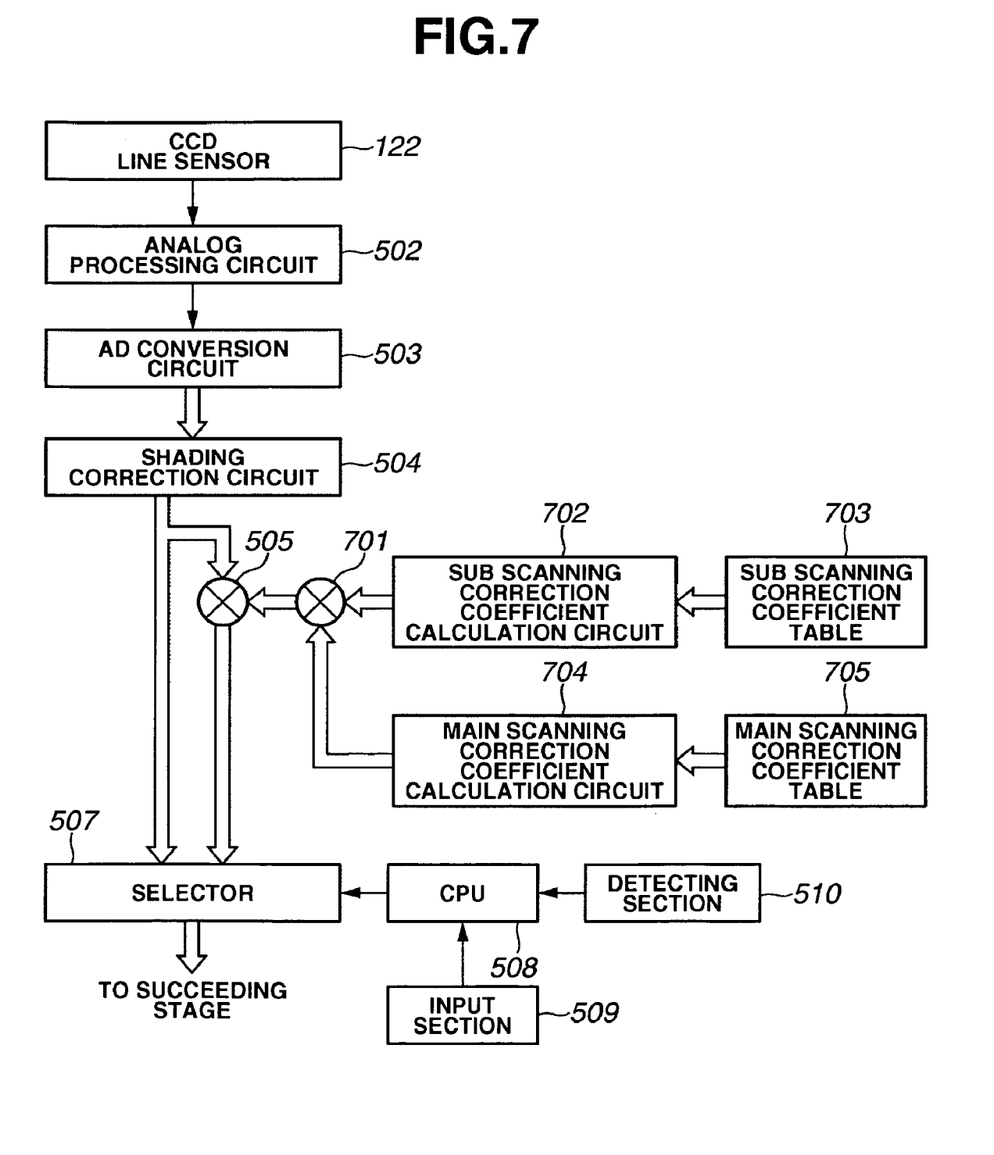
FIG. 7 is a block diagram illustrating an image reading apparatus in accordance with a second exemplary embodiment.

FIG. 7 is an exemplary block diagram illustrating an image reading apparatus in accordance with the second exemplary embodiment. The components similar to those described in the first exemplary embodiment are denoted by the same reference numerals and will not be described in detail.

The image reading apparatus according to the second exemplary embodiment includes a multiplication circuit 701, a sub scanning correction coefficient calculation circuit 702, a sub scanning correction coefficient table 703, a main scanning correction coefficient calculation circuit 704, and a main scanning correction coefficient table 705.

In the second exemplary embodiment, the sub scanning correction coefficient calculation circuit 702 and the main scanning correction coefficient calculation circuit 704 are added to reduce the storage capacity required for storing the correction coefficient tables. The sub scanning correction coefficient table 703 storages sub scanning correction coefficients which are usable to reduce the first image unevenness shown in FIG. 2C. The main scanning correction coefficient table 705 stores main scanning correction coefficients which are usable to reduce the second image unevenness shown in FIG. 3C.

The sub scanning correction coefficient calculation circuit 702 and the sub scanning correction coefficient table 703 can cooperatively produce sub scanning correction coefficients. The sub scanning correction coefficient table 703 stores correction coefficients in relation to the data representing the sub scanning position.

Figure 8:
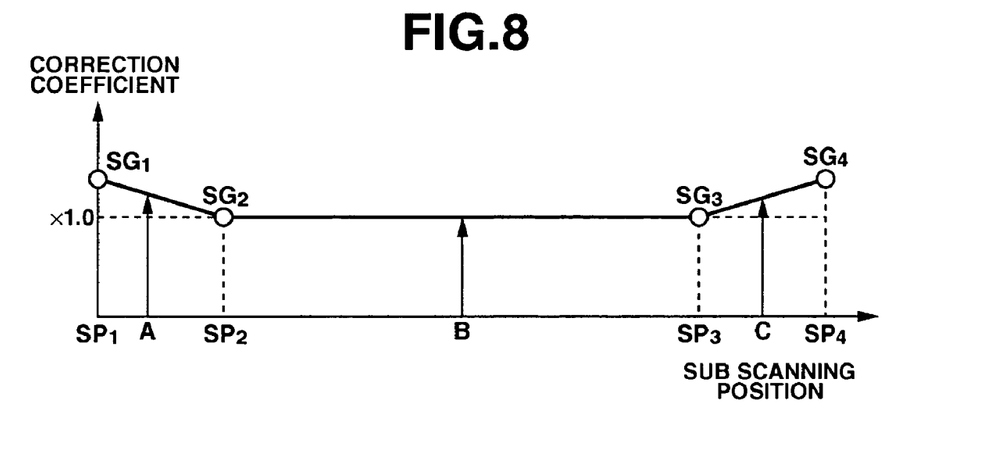
FIG. 8 is a graph showing an example of a sub scanning correction coefficient table in accordance with the second exemplary embodiment.

FIG. 8 is a graph showing an example of the sub scanning correction coefficient table 703 according the second exemplary embodiment. The sub scanning correction coefficient table 703 shown in FIG. 8 stores a total of four correction coefficients $SG_1$, $SG_2$, $SG_3$, and $SG_4$ corresponding to sub scanning positions $SP_1$, $SP_2$, $SP_3$, and $SP_4$, respectively.

The sub scanning correction coefficient calculation circuit 702 can calculate a correction coefficient corresponding to any sub scanning position (e.g., A, B, or C) other than the pre-designated sub scanning positions $SP_1$, $SP_2$, $SP_3$, and $SP_4$ based on the correction coefficients of neighboring sub scanning positions.

For example, the sub scanning correction coefficient calculation circuit 702 can calculate a correction coefficient corresponding to the sub scanning position A, based on the correction coefficients $SG_1$ and $SG_2$ with the following linear approximation.

$$\text{Correction Coefficient (at Point } A) = SG_1 + (A - SP_1) \times (SG_2 - SG_1)/(SP_2 - SP_1) \quad (1)$$

Similarly, the sub scanning correction coefficient calculation circuit 702 can calculate a correction coefficient corresponding to the sub scanning position B or C.

In general, a correction coefficient corresponding to an arbitrary sub scanning position D positioned between two sub scanning positions $SP_n$ and $SP_{n+1}$ can be obtained according to the following formula (2).

$$\text{Correction Coefficient} = SG_n + (D - SP_n) \times (SG_{n+1} - SG_n)/(SP_{n+1} - SP_n) \quad (2)$$

In the formula (2), $SP_n$ represents the sub scanning position data stored in the sub scanning correction coefficient table 703, and $SG_n$ represents a correction coefficient corresponding to the sub scanning position $SP_n$ stored in the sub scanning correction coefficient table 703.

The sub scanning correction coefficient calculation circuit 702 refers to the sub scanning correction coefficient table 703 for each line. More specifically, the sub scanning correction coefficient calculation circuit 702 reads correction coefficients $SG_n$ and $SG_{n+1}$ corresponding to the sub scanning positions $SP_n$ and $SP_{n+1}$ from the sub scanning correction coefficient table 703, and calculates a correction coefficient according to the equation (2).

Finally, the sub scanning correction coefficient calculation circuit 702 outputs plural correction coefficients which cooperatively constitute the solid line shown in FIG. 8. The correction coefficients obtained by the sub scanning correction coefficient calculation circuit 702 can be used to reduce the image unevenness shown in FIG. 2C.

In the present exemplary embodiment, the correction coefficient table 703 stores four sets of correction coefficients. However, the present invention is not limited to the present exemplary embodiment. If necessary, the total number of correction coefficients can be increased or decreased. Furthermore, the formula for calculating the correction coefficients can be determined according to any other approximation method different from the linear approximation.

The main scanning correction coefficient calculation circuit 704 and the main scanning correction coefficient table 705 can cooperatively produce main scanning correction coefficients.

FIGS. 9A through 9D are graphs showing an example of the main scanning correction coefficient table 705 according to the second exemplary embodiment. The main scanning correction coefficient table 705 stores plural correction coefficient sets in relation to the data representing the sub scanning position. Each correction coefficient set includes main scanning correction coefficients corresponding to plural main scanning position data.

Figure 9A:
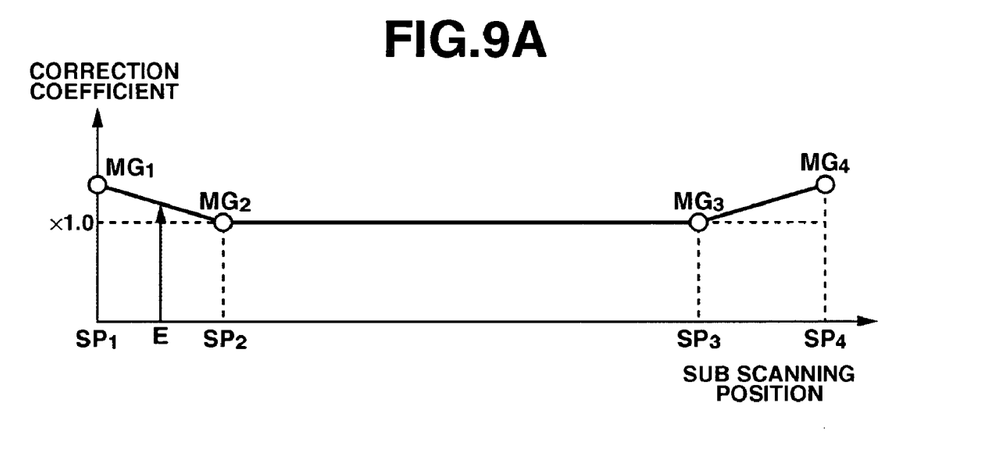
FIGS. 9A through 9D are graphs showing an example of a main scanning correction coefficient table in accordance with the second exemplary embodiment.

FIG. 9A shows an example of correction coefficient sets stored in the main scanning correction coefficient table 705. According to the example shown in FIG. 9A, four correction coefficient sets $MG_1$, $MG_2$, $MG_3$, and $MG_4$ are set so as to correspond to sub scanning positions $SP_1$, $SP_2$, $SP_3$, and $SP_4$, respectively. The main scanning correction coefficient sets $MG_3$ and $MG_4$ corresponding to the sub scanning positions $SP_3$ and $SP_4$ can be determined in a similar manner.

Figure 9B:
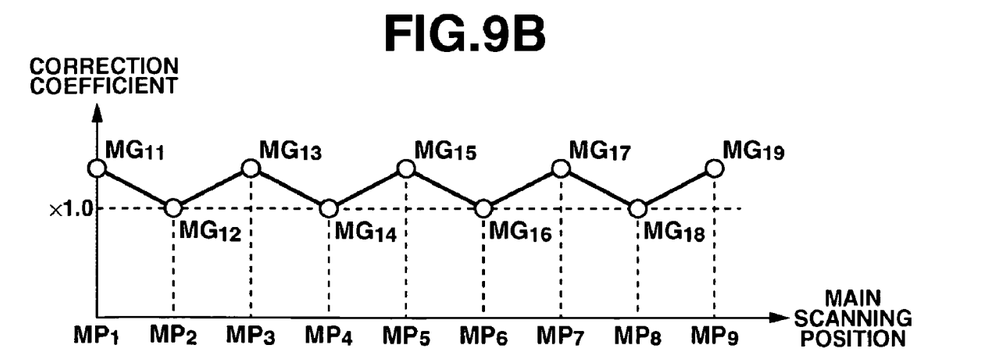

FIG. 9B shows detailed values of the correction coefficient set $MG_1$ corresponding to the sub scanning position $SP_1$. The main scanning correction coefficient set $MG_1$ includes plural correction coefficients (i.e., correction coefficients $MG_{11}$ through $MG_{19}$) corresponding to different main scanning positions (i.e., predetermined main scanning positions $MP_1$ through $MP_9$), as indicated by white circles (unfilled circles) in FIG. 9B.

Figure 9C:
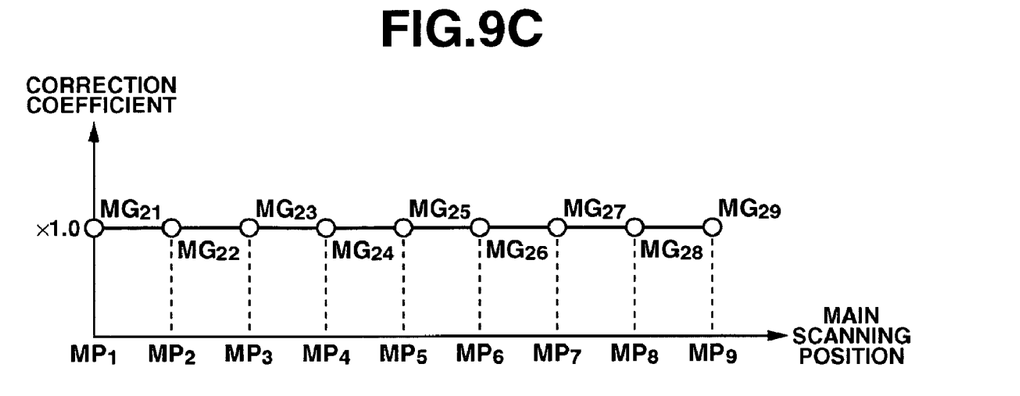

FIG. 9C shows detailed values of the correction coefficient set $MG_2$ corresponding to the sub scanning position $SP_2$. Similarly, the main scanning correction coefficient set $MG_2$ includes plural correction coefficients (i.e., correction coefficients $MG_{21}$ through $MG_{29}$) corresponding to different main scanning positions (i.e., predetermined main scanning positions $MP_1$ through $MP_9$) as indicated by white circles (unfilled circles) in FIG. 9C.

Similar to the sub scanning correction coefficient calculation circuit 702, the main scanning correction coefficient calculation circuit 704 can calculate a correction coefficient set corresponding to any sub scanning position based on the correction coefficient sets of the above pre-designated sub scanning positions $SP_1$ through SP4. Furthermore, the main scanning correction coefficient calculation circuit 704 can calculate a correction coefficient corresponding to any main scanning position based on the correction coefficients of the above pre-designated main scanning positions $MP_1$ through $MP_9$.

First, the main scanning correction coefficient calculation circuit 704 can calculate a correction coefficient set corresponding to an arbitrary sub scanning position, in the following manner. The main scanning correction coefficient calculation circuit 704 calculates a correction coefficient set relating to a sub scanning position E other than the pre-designated sub scanning positions $SP_1$ through $SP_4$, based on the correction coefficient sets corresponding to neighboring sub scanning positions.

For example, the main scanning correction coefficient calculation circuit 704 can calculate a correction coefficient set corresponding to the sub scanning position E shown in FIG.

9A, based on the main scanning correction coefficient set $MG_1$ of the sub scanning position $SP_1$ and the main scanning correction coefficient set $MG_2$ of the sub scanning position $SP_2$, according to the following linear approximation.

$$\text{Correction Coefficient Set (at Sub Scanning Position } E) = MG_{1n} + (E - SP_1) \times (MG_{2n} - MG_{1n})/(SP_2 - SP_1) \quad (3)$$

In the formula (3), $MG_{1n}$ and $MG_{2n}$ represent main scanning correction coefficient sets (n=1, ..., 9) corresponding to the sub scanning positions $SP_1$ and $SP_2$, respectively.

In this manner, with the formula (3), the main scanning correction coefficient calculation circuit 704 can calculate a main scanning correction coefficient set corresponding to any desired sub scanning position E. The calculated correction coefficients are indicated by white circles (unfilled circles) in FIG. 9D.

Figure 9D:
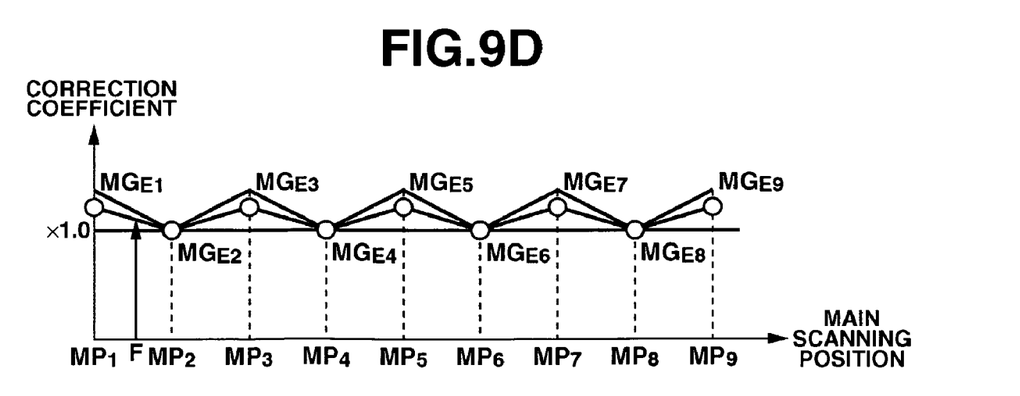

The main scanning correction coefficient calculation circuit 704 can calculate a main scanning correction coefficient set corresponding to each of the other sub scanning positions.

In short, the main scanning correction coefficient calculation circuit 704 can calculate a main scanning correction coefficient set corresponding to an arbitrary sub scanning position X between two sub scanning positions $SP_m$ and $SP_{m+1}$, according to the following formula.

$$\text{Correction Coefficient Set } MG_{xn}(\text{at Sub Scanning Position } X) = MG_{mn} + (X - SP_m) \times (MG_{m+1n} - MG_{mn})/(SP_{m+1} - SP_m) \quad (4)$$

In the formula (4), $SP_m$ represents a sub scanning position (m=1, ..., 4) stored in the main scanning correction coefficient table 705, and $MG_{mn}$ and $MG_{m+1n}$ represent main scanning coefficient sets (n=1, ..., 9) corresponding to the sub scanning positions $SP_m$ and $SP_{m+1}$, respectively.

Next, an exemplary method for calculating a correction coefficient corresponding to an arbitrary point between two main scanning positions will be described.

The main scanning correction coefficient calculation circuit 704 can calculate correction coefficients of other scanning positions different from the main scanning positions $MP_1$ through $MP_9$, based on the correction coefficients corresponding to at least two neighboring main scanning positions.

For example, the main scanning correction coefficient calculation circuit 704 can calculate a correction coefficient corresponding to a main scanning position F shown in FIG. 9D, based on two correction coefficients $MG_{E1}$ and $MG_{E2}$, according to the following linear approximation.

$$\text{Correction Coefficient (at Main Scanning Position } F) = MG_{E1} + (F - MP_1) \times (MG_{E2} - MG_{E1})/(MP_2 - MP_1) \quad (5)$$

In the formula (5), $MP_1$ and $MP_2$ represent main scanning positions, and $MG_{E1}$ and $MG_{E2}$ represent correction coefficients corresponding to the main scanning positions $MP_1$ and $MP_2$, respectively.

The main scanning correction coefficient calculation circuit 704 can calculate a correction coefficient corresponding to any other main scanning position in a similar manner (with a similar linear approximation).

Finally, the main scanning correction coefficient calculation circuit 704 obtains plural correction coefficients which cooperatively constitute the solid line shown in FIG. 9D, as main scanning correction coefficients relating to the sub scanning position E.

In general, a correction coefficient corresponding to an arbitrary main scanning position Y relating to the correction coefficient set $MG_{xn}$ corresponding to an arbitrary sub scanning position X can be obtained according to the following formula.

$$\text{Correction Coefficient (at Main Scanning Position } Y) = MG_{xn} + (Y - MP_n) \times (MG_{xn+1} - MG_{xn})/(MP_{n+1} - MP_n) \quad (6)$$

In the formula (6), $MP_n$ represents a main scanning position, and $MG_{xn}$ represents a main scanning correction coefficient set (n=1, ..., 9) relating to the sub scanning position $SP_x$.

The main scanning correction coefficient calculation circuit 704 refers to the main scanning correction coefficient table 705 for each line, calculates correction coefficients, and outputs the calculated correction coefficients.

The multiplication circuit 701 multiplies the correction coefficient calculated by the sub scanning correction coefficient calculation circuit 702 and the correction coefficient calculated by the main scanning correction coefficient calculation circuit 704.

The multiplication circuit 505 multiplies the multiplication result (i.e., a product of coefficients) obtained by the multiplication circuit 701 with image data output from the shading correction circuit 504.

With the above processing, the image reading apparatus can contemporaneously correct lowering of the reading level (image unevenness) caused by the conveyance belt 107 floating at the leading edge and the trailing edge in the sub scanning direction and lowering of the reading level (image unevenness) caused by the conveyance belt 107 deflecting in the main scanning direction (refer to FIG. 4).

As described in the first exemplary embodiment, the selector 507 can selectively output image data having a corrected reading level or image data having a non-corrected reading level to a succeeding stage (circuit).

In the example shown in FIGS. 9A through 9D, the correction coefficient sets $MG_1$ through $MG_4$ correspond to the sub scanning positions $SP_1$ through $SP_4$, respectively. However, the present invention is not limited to the above-described exemplary embodiment. The total number of correction coefficient sets, or the number of main scanning correction coefficients, can be increased or decreased appropriately. Furthermore, the formula for calculating the correction coefficients can be determined according to any other approximation method different from the linear approximation.

As described above, the second exemplary embodiment brings the following effects in addition to the effects of the first exemplary embodiment.

The image reading apparatus according to the second exemplary embodiment includes the table 705, the table 703, and the calculating section. The table 705 can store a first correction coefficient usable to correct image unevenness caused by the conveyance belt 107 deflecting in the main scanning direction. The table 703 can store a second correction coefficient usable to correct image unevenness caused by the conveyance belt 107 floating against the document positioning plate 113 at the leading edge or the trailing edge in the sub scanning direction. The calculating section (e.g., the calculation circuits 704 and 702 and the multiplication circuit 701) can calculate a correction coefficient at each sub scanning position of the image based on the first correction coefficient and the second correction coefficient.

Compared to the first exemplary embodiment according to which all of the required correction coefficients are stored in the correction coefficient table, the correction coefficient table of the second exemplary embodiment stores only part of the required correction coefficients. Accordingly, a required storage capacity of the storage apparatus can be reduced.

Third Exemplary Embodiment

As described above, optimum correction coefficients may vary depending on the type of a document (e.g., thickness). Hence, the third exemplary embodiment provides a method for adjusting a correction coefficient with an adjustment value β corresponding to the type of a document.

Figure 10:
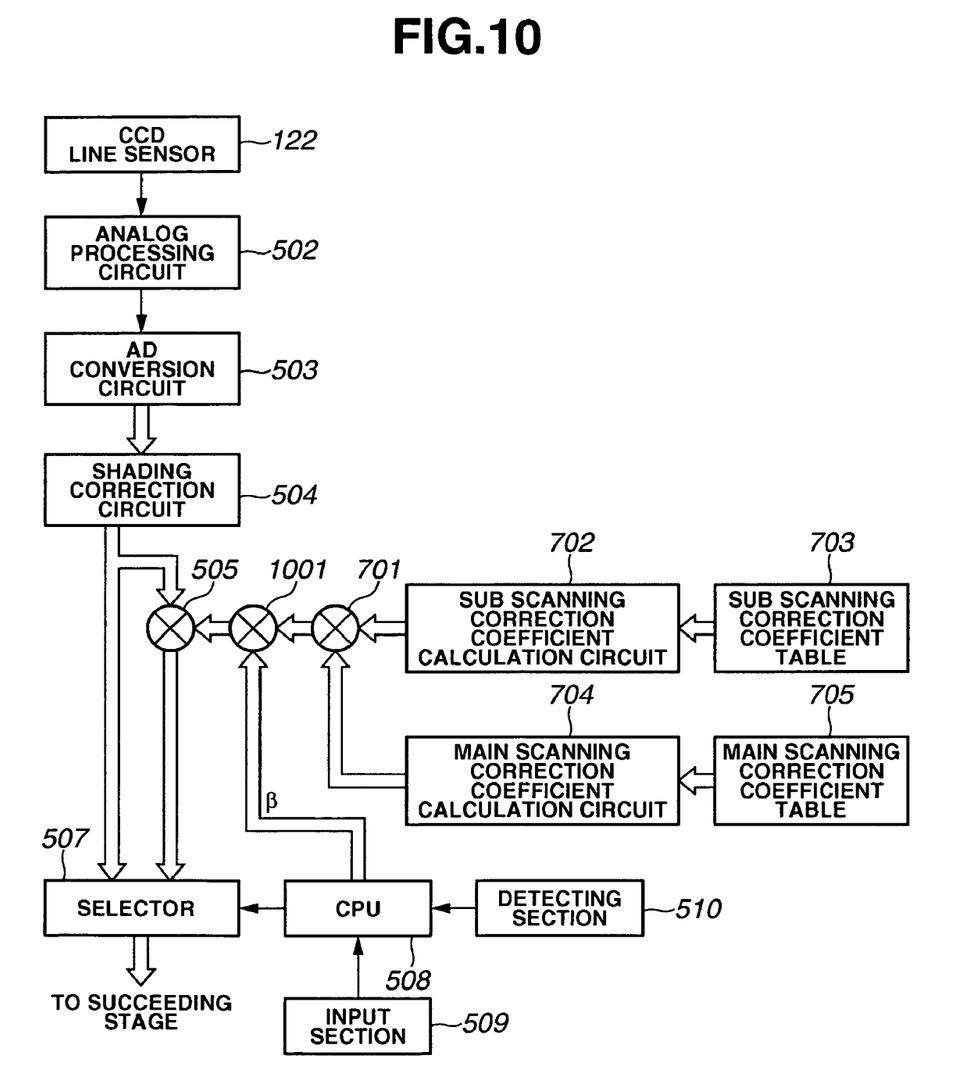
FIG. 10 is a block diagram illustrating an image reading apparatus in accordance with a third exemplary embodiment.

FIG. 10 is a block diagram illustrating an image reading apparatus in accordance with the third exemplary embodiment. The components similar to those described in the first or second exemplary embodiment are denoted by the same reference numerals and will not be described in detail.

The image reading apparatus of the third exemplary embodiment is different from the image reading apparatus shown in FIG. 7 in that a multiplication circuit 1001 is added. The multiplication circuit 1001 can multiply a predetermined adjustment value β ($0.0 \leq \beta \leq 1.0$) supplied from the CPU 508 with a product of the sub scanning correction coefficient and the main scanning correction coefficient output from the multiplication circuit 701.

The adjustment value β is determined beforehand with reference to the type of a document (e.g., thickness). Thus, the CPU 508 can adequately adjust a correction coefficient based on the adjustment value β.

As described above, the information relating to the type of a document (e.g., thickness) can be transmitted from the input section 509 or the detecting section 510 to the CPU 508. The CPU 508 can determine an optimum adjustment value β that suits the type of a document entered via the input section 509 or the detecting section 510.

For example, it is now assumed that a table includes plural values of the adjustment value β corresponding to 10 types of documents (e.g., thicknesses). In this case, the CPU 508 can read, from the table, an optimum adjustment value β with reference to the information relating to the type of a document entered via the input section 509 or the detecting section 510 and can output the readout adjustment value β to the multiplication circuit 1001. The table can be stored in a read-only memory (ROM) or another storage apparatus.

Furthermore, when the CPU 508 can obtain the light transmissivity of a document from the detecting section 510, the CPU 508 can calculate an adjustment value β corresponding to the detected transmissivity according to a predetermined formula. The predetermined formula may be obtained beforehand based on experimental data and can be stored in a ROM or another storage apparatus.

As described above, the third exemplary embodiment brings the effect of realizing the reading level correction (i.e., correction of image unevenness) reflecting the type of a document (e.g., thickness), in addition to the effects of the first and second exemplary embodiments.

More specifically, performing the correction coefficient adjustment with the adjustment value β reflecting the type of a document enables adequately reducing the image unevenness in various types of documents.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-176892 filed Jun. 16, 2005, which is hereby incorporated by reference herein in its entirety.

What is claimed is:

1. An image reading apparatus configured to correct image unevenness, the apparatus comprising:
    a document positioning plate configured to position a document thereon;
    a conveyance belt configured to convey the document to the document positioning plate in a first general conveying direction;
    an image reading unit configured to read an image of the document positioned on the document positioning plate; and
    an image unevenness reducing unit configured to reduce image unevenness caused by the conveyance belt deflecting in a second direction generally orthogonal to the first conveying direction of the conveyance belt,
    wherein the image unevenness reducing unit includes a correction unit configured to correct the image based on correction coefficients corresponding to a combination of a first position with respect to the first conveying direction and a second position with respect to the second direction of the image.

2. The image reading apparatus according to claim 1, wherein the image unevenness reducing unit is configured to further reduce image unevenness caused by the conveyance belt floating against the document positioning plate at a leading edge or a trailing edge in the first conveying direction.

3. The image reading apparatus according to claim 1, wherein the correction unit includes:
    a correction coefficient storage unit configured to store the correction coefficients each corresponding to a combination of the first position and the second position of the image; and
    a multiplication unit configured to multiply the correction coefficients with image data for each line of the image.

4. The image reading apparatus according to claim 1, further comprising a control unit configured to control execution/non-execution of unevenness reduction processing performed by the image unevenness reducing unit.

5. The image reading apparatus according to claim 4, further comprising an input unit configured to input, to the control unit, an instruction relating to execution/non-execution of unevenness reduction processing performed by the image unevenness reducing unit.

6. The image reading apparatus according to claim 4, further comprising a detection unit configured to detect a type of the document, wherein the control unit selectively determines execution/non-execution of unevenness reduction processing performed by the image unevenness reducing unit, according to the type of the document detected by the detection unit.

7. The image reading apparatus according to claim 1, wherein the correction unit includes:
    a first storage unit configured to store a first correction coefficient usable to correct image unevenness caused by the conveyance belt floating against the document positioning plate at a leading edge or a trailing edge in the first conveying direction;
    a second storage unit configured to store a second correction coefficient usable to correct image unevenness caused by the conveyance belt deflecting in the second direction; and
    a calculation unit configured to calculate a correction coefficient corresponding to the first position of the image based on the first correction coefficient and the second correction coefficient.

8. The image reading apparatus according to claim 7, further comprising an adjustment unit configured to adjust a correction coefficient calculated by the calculation unit according to a type of the document.

9. An image processing method for an image reading apparatus including a document positioning plate configured to position a document thereon, a conveyance belt configured to convey the document to the document positioning plate in a first general conveying direction, and an image reading unit configured to read an image of the document positioned on the document positioning plate, the method comprising:

reducing image unevenness caused by the conveyance belt deflecting in a second direction generally orthogonal to the first conveying direction of the conveyance belt by correcting the image based on correction coefficients each corresponding to a combination of a first position with respect to the first conveying direction and a second position with respect to the second direction of the image.

10. The image processing method according to claim 9, wherein reducing image unevenness includes correcting the image by multiplying the correction coefficients each corresponding to a combination of the first position and the second position of the image with image data for each line of the image.

11. The image processing method according to claim 9, further comprising controlling execution/non-execution of unevenness reduction processing performed while reducing image unevenness.

12. The image processing method according to claim 11, further comprising instructing execution/non-execution of unevenness reduction processing performed while reducing image unevenness.

13. The image processing method according to claim 11, further comprising detecting a type of the document, wherein the control step includes selectively determining execution/non-execution of unevenness reduction processing performed while reducing image unevenness according to the type of the document detected.

* * * * *